United States Patent Office 3,197,478
Patented July 27, 1965

3,197,478
1,3-DIPHENYL-2-BENZOYL-IMIDAZOLIDINES AND PROCESS
Hans-Werner Wanzlick, Berlin-Spandau, Eberhard Schikora, Bensheim-Auerbach, and Hans-Jerg Kleiner, Berlin-Halensee, Germany, assignors to Schering AG., Berlin, Germany
No Drawing. Filed Oct. 16, 1961, Ser. No. 145,503
Claims priority, application Germany, Oct. 22, 1960, Sch 28,649, Sch 28,650
10 Claims. (Cl. 260—309.7)

The present invention relates to mono-(diarylamino-ethane) derivatives, and more particularly to mono-(diaryl-amino-ethane derivatives of dicarbonyl compounds.

It is an object of the present invention to provide new mono-(diarylamino-ethane) derivatives of dicarbonyl compounds.

It is another object of the present invention to provide a method of producing such compounds starting with bis-[1,3-diaryl-imidazolidinylidene-(2)]-compounds.

It is yet another object of the present invention to provide an improved process of producing such bis-[1,3-diaryl-imidazolidinylidene-(2)-compounds.

Other objects and advantages of the present invention will be apparent from a further reading of the specification and of the appended claims.

With the above and other objects in view, the present invention mainly comprises a compound selected from the group consisting of compounds of the formula:

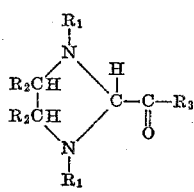

compounds of the formula

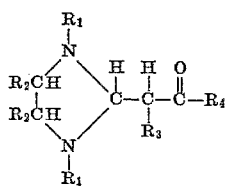

and compounds of the formula

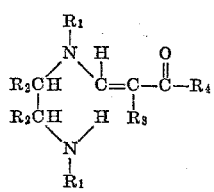

wherein $R_1$ is aryl, wherein $R_2$ is selected from the group consisting of hydrogen and hydrocarbon radicals, wherein $R_3$ in the first formula above is hydrogen and in the last two formulas above is either hydrogen or together with $R_4$ is a hydrocarbon radical, while $R_4$ is either itself a hydrocarbon radical such as lower alkoxy phenyl, halogen-phenyl, notrophenyl or furyl, or $R_4$ together with $R_3$ is a hydrocarbon radical.

The method of the present invention mainly comprises reacting a bis-[1,3-diaryl-imidazolidinylidene-(2)] of the formula:

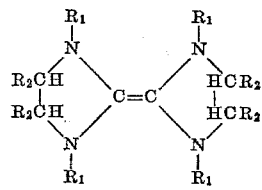

wherein $R_1$ and $R^2$ have the same definitions as above with a compound selected from the group consisting of aldehydes of the formula:

and ketones of the formula:

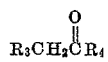

wherein $R_3$ and $R_4$ have the same definitions as above.

It is apparent from the above description that bis-[1,3-diaryl-imidazolidinylidene-(2)]-compounds can be reacted with an aldehyde or with a ketone which contains an active methyl or methylene group to produce mono-(diaryl-aminoethane)-derivatives of dicarbonyl compounds.

The mono-(diarylaminoethane)-derivatives of dicarbonyl compounds which can be synthesized in accordance with the present invention from monocarbonyl compounds can be split by acid hydrolysis (for example analogously to the reaction described by H. W. Wanzlick and W. Loechel in Ber. dtsch chem. Ges 86, 1463 (1953), wherein 1,2-dianilino-ethane is reacted with aldehydes to form the corresponding dianilino-ethane derivatives, which is an imidazolidine, from which the aldehyde is recovered by acid hydrolysis) into free carbonyl compounds and in this manner to produce the dicarbonyl compounds.

Dicarbonyl compounds are valuable starting materials for chemical syntheses, particularly for the production of heterocyclic compounds such as pyrazolines and imidazolines. In addition, the compounds of the present invention are valuable intermediate products for the production of therapeutic agents.

The reaction proceeds in accordance with the equations which will be set forth below. The reaction varies somewhat for aldehydes and ketones, and in the case of aldehydes there is obtained mono-(diarylaminoethane)- derivatives of $\alpha\beta$-dicarbonyl compounds, whereas in the case of ketones which contain an active methyl or methylene group there is obtained mono-(diarylaminoethane)-derivatives of $\alpha,\gamma$-dicarbonyl compounds, which latter are present in two tautomeric forms.

The reaction of bis-[1,3-diaryl-imidazolidinyl-idene-(2)]-compounds with aldehydes proceeds in accordance with the following equations:

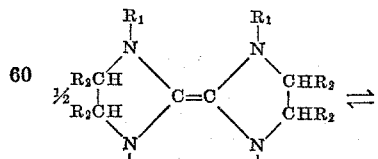

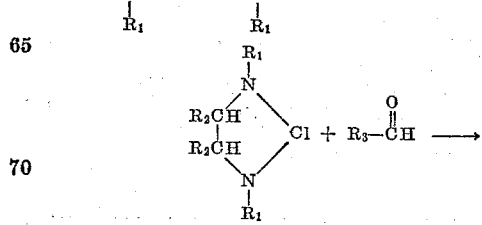

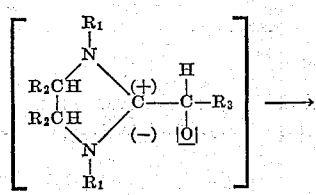

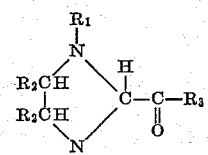

wherein $R_1$, $R_2$ and $R_3$ have the same definitions as above.

The reaction of bis[1,3,-diaryl-imidazolidinylidene-(2)]-compounds with ketones containing an active methyl or active methylene group proceeds in accordance with the following equations:

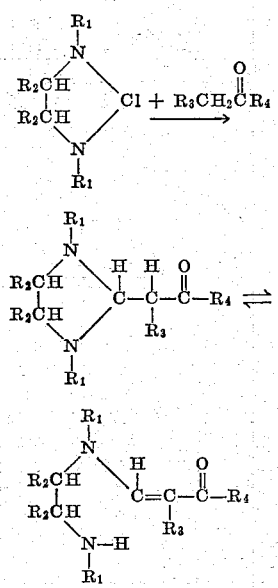

wherein $R_1$, $R_2$, $R_3$ and $R_4$ have the same definitions as above.

The above tautomers exist analogously to the tautomeric system between α-formyl ketones and hydroxymethylene ketones, as follows:

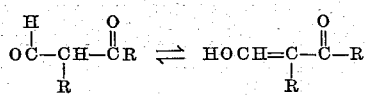

The starting compounds for the method of the present invention, for example bis-[1,3-diphenylimidazolidinylidene-(2)] have already been produced by the reaction of dianilino-ethane and chloral with subsequent thermal splitting of chloroform. The product produced according to this method has hwever always been colored and was obtained in very low yields.

It has been found, and this is a further object of the present invention, that it is possible with a high degree of purity and practically in quantitative yields to produce bis-[1,3-diarylimidazolidinylidene-(2)] compounds by reacting diarylaminoethane compounds with ortho-formic acid esters. The reaction is preferably carried out under warmth and proceeds with the splitting off of alcohol, as follows:

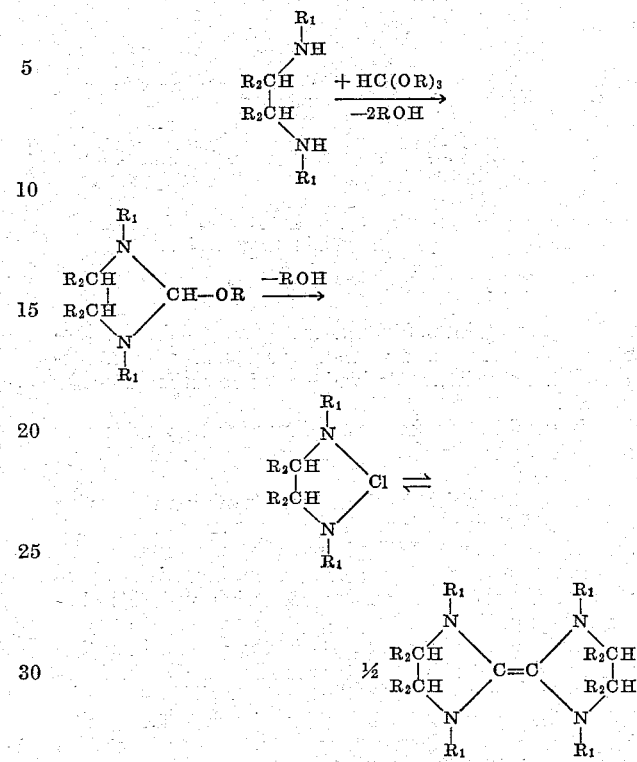

wherein $R_1$ and $R_2$ have the same definitions as above, and wherein R is a hydrocarbon radical.

Since the monomeric form of the bis-[1,3-diaryl-imidazolidinylidene-(2)]-compounds is, like carbene, sensitive to oxygen, it is necessary during the production of these compounds and also during the further reactions with aldehydes and ketones to carry out the same under the exclusion of oxygen. Preferably the reaction is carried out using a protective gas atmosphere such as a nitrogen atmosphere.

The following examples are given to further illustrate the present invention. The scope of the invention is not, however, meant to be limited to the specific details of the examples.

*Example 1*

For the example of bis-[1,3-diphenyl-imidazolidinylidene-(2)], 19.7 g. of water-free dianilino-ethane are cooked for 1 hour under refluxing under nitrogen (oil bath temperature of about 180° C.) with 120 cc. of water free ortho-formic acid ethyl ester which have been fractionated over potassium carbonate. The cooling water is then turned off and vigorous cooking is continued for an additional 4 hours at 185–190° C. bath temperature. As a result the cooled water gradually starts to boil, whereby the alcohol formed by the reaction escapes from the reaction mixture and after awhile the product starts to separate. While the nitrogen stream is running the flask is cooled with ice water, after 10 minutes filtered off under suction and with a large amount of ether, in which the product is practically insoluble, washed. The yield is 19.3 g.=93.5% of the theoretical. The yields of 96% can also be obtained.

The already quite pure precipitated product is recrystallized from dry, technical xylene mixture under nitrogen. From 14 g. of the crude product there is obtained by cooking with 650 cc. of xylene mixture after 10 minutes of cooling with ice water 13.5 g. of the pure substance is obtained.

The reaction can be directly started by shutting off the cooling water. A practically loss-free recovery of the excess ortho-ester is possible by distillation of the reaction mother liquor at somewhat reduced pressure. The dry product is stable for about one week if it is stored in brown flasks. In contact with solvents, particularly polar solvents, with which an intensive violet coloring often occurs, the product is quickly oxidized to 1,3-diphenylimidazolidone-(2).

*Example 2*

Production of 1,3-diphenyl-2-benzoyl-imidazolidine of the formula:

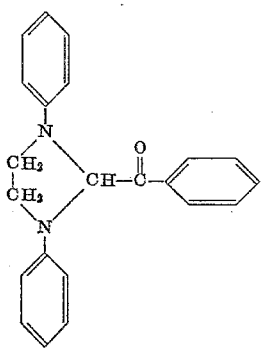

2.71 g. of bis-[1,3-diphenyl-imidazolidinylidene-(2)], recrystallized from xylene mixture under nitrogen, are poured into 15 cc. of vacuum-distilled benzaldehyde in a magnetic stirrer provided with a two-neck flask. By first passing through a strong nitrogen stream (incandescent lamp nitrogen) while directly starting to stir the flask is immersed in an oil bath preheated at 135° C., the nitrogen stream is strongly reduced after 5 minutes and at an oil bath temperature of 120–135° C. the stirring is continued for an additional 20 minutes. After cooling the excess benzaldehyde is drawn off under vacuum (22 mm. Hg at 120° C. oil bath temperature). The vacuum distillation is broken off when at constant vacuum after gradual increase of the oil bath temperature to 150° C. no volatile portion is driven off. By rubbing the remaining syrup with 20 cc. of methanol crystallization starts after about 5 minutes. After ¼ hour standing in a deep freeze box it is filtered off under suction, washed three times with 10 cc. of icecold methanol and after ½ hour at room temperature and 0.05 mm. Hg of pressure is dried.

The yield of 1,3-diphenyl-2-benzoylimidazolidine is 3.57 g.=89% of the theoretical. The melting point is 104–105° C. After recrystallization two times from methanol the melting point is 107–108° C. With the material produced from dianilino-ethane and phenyl glyoxal there is no melting point depression.

By bringing together the reaction components at room temperature an intensive violet coloring occurs instantly which, however, upon immersion into a hot oil bath very rapidly disappears. A short time later it goes completely into solution. From this it may be concluded that the reaction also proceeds sufficiently rapidly at lower temperatures.

*Example 3*

The production of 1,3-diphenyl-2-p-methoxybenzoyl-imidazolidine of the formula:

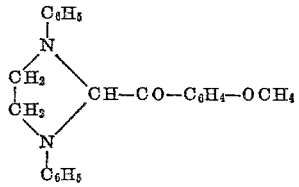

3 g. of bis-[1,3-diphenyl-imidazolidinylidene-(2)] are heated under refluxing under pure nitrogen in a paraffin bath at a temperature of 150–160° C. 14 cc. of p-methoxybenzaldehyde (acid-free and freshly distilled) are added to the reflux cooler and washed down with 25 cc. of xylene. The solution is maintained at boiling for 90 minutes. Xylene and excess p-methoxybenzaldehyde are distilled off under vacuum (13 mm. Hg) using a paraffin bath at a temperature of 160° C. The dark yellow residue which is turbid in the cold is freed of remaining p-methoxybenzaldehyde on the oil pump under high vacuum.

The product becomes colored gradually during the procedure to an amber color. The syrup is thereupon permitted to stand with a small amount of ethanol for 12 hours in an ice box, 4 g. of a light yellow crystallizate is filtered off under suction. After recrystallization two times from ethanol there is obtained 1.7 g. of weakly yellowish colored needles of 1,3-diphenyl-2-methoxybenzoylimidazolidine. The yield of the crude product is 80% of the theoretical. After drying over potassium hydroxide under vacuum the melting point is 122° C.

*Example 4*

Production of 1,3 - diphenyl - 2 - chlorobenzoylimidazolidine of the formula:

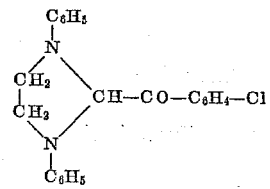

1.5 g. of bis-[1,3-diphenyl-imidazolidinylidene-(2)] are heated in 15 cc. of water-free xylene under nitrogen. The paraffin bath is maintained at 150° C. for 20 minutes. Thereupon 1 g. of p-chlorobenzaldehyde in 18 cc. of xylene are added through the cooler and washed down with 15 cc. of xylene. The bath is thereupon maintained at 150° C. for 90 minutes. After 20 minutes the start of the reaction is visible. After an additional 90 minutes everything has gone into solution, the liquid is luminous yellow. The xylene is drawn off under vacuum. There remains a dark yellowish very viscous oil which is rubbed with a small amount of ethanol in an ice bath. After an additional hour 1.55 g. of the 1,3-diphenyl-p-chlorobenzoyl-imidazolidine is obtained in the form of lemon-yellow crystals which are filtered off. The yield is 62% of the theoretical. The melting point is 112–114° C. (after 20 hours of drying under vacuum over potassium hydroxide).

*Example 5*

Production of 1,3 - diphenyl-2-chlorobenzoylimidazolidine of the formula:

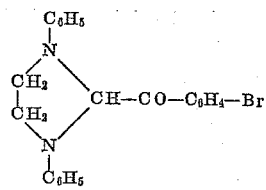

3 g. of bis-[1,3-diphenyl-imidazolidinylidene-(2)] in 20 cc. of xylene are maintained at a temperature of 90° C. in a paraffin bath under nitrogen and 3.3 g. of p-bromobenzaldehyde in 20 cc. of xylene are added there thereto through the cooler and washed down with 30 cc. of xylene. A reaction acceleration occurs at a bath temperature of 150° C. The temperature is then maintained for 45 minutes at 130° C. Xylene is distilled off under vacuum and the syrup is rubbed in an ice bath with a small amount of ethanol. There is thus obtained 3.4 g. of 1,3-diphenyl-2-p-bromobenzoyl-imidazolidine in a yield of 51% of the theoretical in the form of yellowish crystals. The crystals are washed with a large amount of ice cold ethanol and recrystallized from ethanol. The melting point is 131° C. after recrystallization two times.

Example 6

The production of 1,3-diphenyl-2-p-iiodobenzoyl-imidazolidine of the formula:

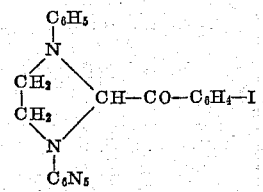

1.50 g. of bis-[1,3-diphenyl-imidazolidinylidene-(2)] in 15 cc. of xylene are brought to a temperature of 130–140° C. in a paraffin bath, after 90 minutes 1.6 g. of p-iiodobenzaldehyde in 28 cc. of xylene are added and after an additional 90 minutes there is added two times, each time 0.2 g. of p-iiodobenzaldehyde in 10 cc. of xylene. The reaction product precipitates in the form of yellowish crystals and are recrystallized two times from ethanol and dried over potassium hydroxide under vacum for 12 hours. The yield of pure 1,4,-diphenyl-2-p-iiodozenzoyl-imidazolidine amounts to 2 g. (corresponding to 66% of the theoretical); the melting point is 140–147° C.

Example 7

The production of 1,3-diphenyl-2-m-nitrobenzoylimidazolidine of the formula:

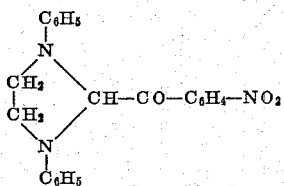

1.1 g. of m-nitrobenzaldehyde in 12 cc. of xylene are added to 1.5 g. of bis-[1,3-diphenyl-imidazolidinylidene-(2)] in 10 cc. of xylene under nitrogen and at a bath temperature of 150° C. and are then washed down with 9 cc. of xylene. After 1 hour of reaction time a thick reddish brown syrup is formed which is extremely difficult to bring to crystallization. By dissolving in methanol, heating, cooling and addition of a large amount of ice water and after standing for 2 days in an ice box a yellowish precipitate of 1,3-diphenyl-2-m-nitrobenzoyl-imidazolidine is formed and is filtered off. Upon drying of a potassium hydroxide in vacum it becomes ocher colored. The melting point is 60° C.

Example 8

The production of 1,3-diphenyl-2-furfuroylimidazolidine of the formula:

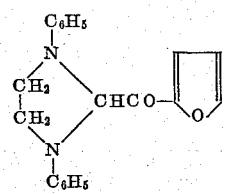

3 g. of bis-[1,3-diphenyl-imidazolidinylidene(2)] and 15 cc. of fresh distilled furfural which has first been shaken with sodium carbonate solution then dried are heated under pure nitrogen in an oil bath at 135° C. The suspension which is at first violet colored loses its color at increasing temperature and after 1 hour the reaction is completed. The reaction mixture is then cooled with ice, digested with ether, filtered off under suction and washed with ether whereby 2.32 g. of furoin are isolated. The filtrate is concentrated, the oily residue is brought to crystallization by rubbing with methanol. It is filtered off under suction and washed with a small amount of methanol. 3.70 g. of a crude product still containing furoin is obtained. After recrystallization from 100 cc. of ethanol there is obtained 1.90 g. of the pure reaction product, which corresponds to 44.5% of the theoretical. After recrystallization from alchohol lemon-yellowish needles are obtained which melt at 138–140° C.

Example 9

The production of 1,3-di-p-methoxyphenyl-2-furfuroyl-imidazolidine of the formula:

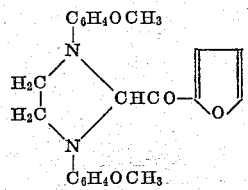

3.81 g. of bis-[1,3-di-p-methoxyphenyl-imidazolidinylidine(2)] are suspended in 15 cc. of furfural which has been purified as described above, under nitrogen. The color of the suspension is deep blue-violet. By heating the oil bath a decolorization occurs at about 50° C., at about 70° C. the reaction solution becomes brownish-black. The reaction mixture is heated to 90° C. After 1 hour the color is reddish-yellow and the reaction is completed. The reaction mixture is cooled with ice, digested with ether, filtered off under suction and washed with ether whereby 4.00 g. of furoin are isolated. The filtrate is concentrated and the oily residue is brought to crystallization by means of ether-ethanol. There is obtained by working up of the mother liquor 5.57 g. of furoin-containing crude product. After recrystallization from 100 cc. of ethanol there is obtained 2.92 g. of pure reaction product corresponding to 57% of the theoretical. After recrystallization from alcohol there is obtained deep yellow crystals which melt at 120–122° C.

Example 10

The production of 1,3-di-p-methoxyphenyl-2-benzoyl-imidazolidine of the formula:

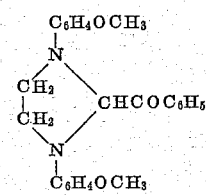

3 g. of bis-[1,3-di-p-methoxyphenyl-imidazolidinylidene-(2)] are. under nitrogen, shaken into 15 cc. of freshly distilled benzaldehyde at a temperature of 130° C. After not later than 5 minutes the reaction is completed. The excess benzaldehyde is distilled off and the residue is digested with ether, filtered off under suction and washed. There is thus obtained 3.25 g. of a crude product containing a small amount of benzoin. After recrystallization from ethanol the pure end product is obtained in an amount of 2.10 g.=51% of the theoretical. Recrystallization from alcohol gives deep yellow crystals which melt at 123–125° C.

Example 11

Production of 1,3-diphenyl-2-(2-oxocyclohexyl)imidazolidine which in its tautomeric form has the formula:

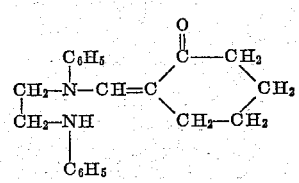

15 cc. of cyclohexanone (approximately 16.5 g.) are added to 2.3 g. of bis-[1,3-diphenyl-imidazolidinylidene- (2)] which is under nitrogen and the bath temperature is slowly increased to 125° C. The solution takes on a yellowish brown color. At a bath temperature of 140–150° C. the cyclohexanone starts to go into solution. After 30 minutes everything is dissolved. Excess cyclohexanone is distilled off under vacuum. There remains a reddish-brown syrup which is allowed to stand for 3 days in an ice box with a small amount of ethanol. Brownish yellow crystals are then filtered off under suction. The mother liquor is again stored for 1 day in an ice box, whereupon light yellowish crystals are filtered off. These crystals from the mother liquor after recrystallization from ethanol and drying under vacuum over potassium hydroxide have a melting point of 130° C. The total yield is 1.45 g. which corresponds to 67% of the theoretical.

*Example 12*

The production of the dianilino-ethane derivative of 1-phenyl-1,3-dioxopropan, of the formula:

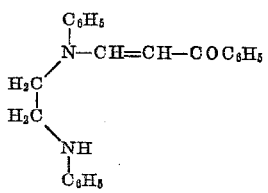

3 g. of bis-[1,2-diphenyl-imidazolidinylidene-(2)] and 15 cc. of acetophenone which has been freshly distilled and dried over phosphorous pentoxide are heated under pure nitrogen in an oil bath to 110° C. The suspension which is violet at first loses its color at about 80° C. and after 1 hour a clear solution is formed. The reaction is completed. The reaction mixture is cooled, digested with 10 cc. of ether, filtered off under suction and then washed with 25 cc. of ether. The yield is 3.57 g. By working up the mother liquor an additional 0.52 g. is obtained. The total yield is 4.09 g.=88.5% of the theoretical. After recrystallization from alcohol, benzene or acetone, needles of light yellowish color are obtained.

*Example 13*

The production of the dianilino-ethane derivative of 2-oxymethylen-hydrindone, of the formula:

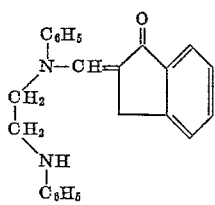

3 g. of bis-[1,3-diphenyl-imidazolidinylidene-(2)] and 1.8 g. of α-hydrindone which has been freshly distilled and dried over phosphorous pentoxide are suspended in 15 cc. of absolute technical xylene mixture under pure nitrogen and heated in an oil bath to 130° C. After 1 hour the reaction is completed. After cooling the reaction mixture is filtered off under suction, washed with 10 cc. of xylene and the yield is 3.74 g. By further working up of the mother liquor an additional 0.41 g. is obtained. The total yield amounts to 4.15 g.=86.5% of the theoretical. After recrystallization from alcohol crystals are obtained of a light yellowish color. The melting point is 142–144° C.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:
1. A compound of the formula:

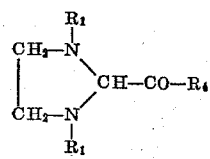

wherein $R_1$ is selected from the group consisting of phenyl and lower alkoxy phenyl; and wherein $R_4$ is selected from the group consisting of lower alkoxy phenyl, halogenphenyl, nitrophenyl and furyl.

2. 1,3-diphenyl-2-p-methoxybenzoylimidazolidine of the formula:

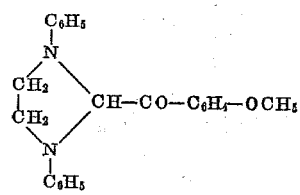

3. 1,3-diphenyl-2-chlorobenzoyl-imidazolidine of the formula:

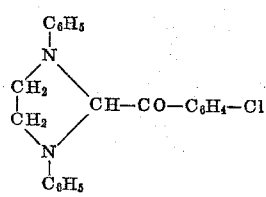

4. 1,3-diphenyl-2-p-bromobenzoyl-imidazolidine of the formula:

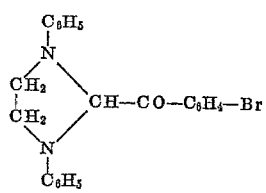

5. 1,3-diphenyl-2-p-iiodobenzoyl-imidazolidine of the formula:

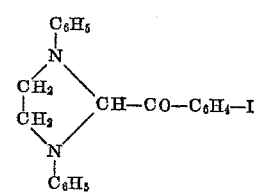

6. 1,3-diphenyl-2-m-nitrobenzoyl-imidazolidine of the formula:

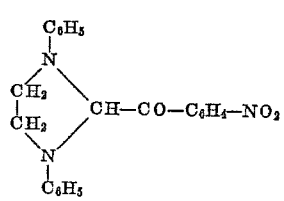

7. 1,3-diphenyl-2-furfuroyl-imidazolidine of the formula:

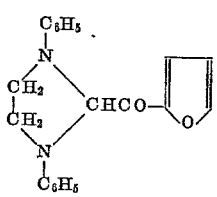

8. 1,3-di-p-methoxyphenyl-2-furfuroyl-imidazolidine of the formula:

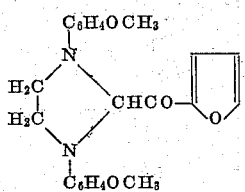

9. 1,3-di-p-methoxyphenyl-2-benzoyl-imidazolidine of the formula:

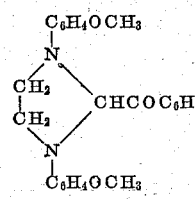

10. The method of producing a compound of the formula:

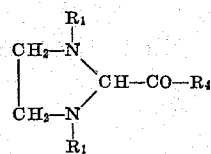

wherein $R_1$ is selected from the group consisting of phenyl and lower alkoxy phenyl, and wherein $R_4$ is selected from the group consisting of lower alkoxy phenyl, halogenphenyl, nitrophenyl and furyl, which comprises reacting a bis-[1,3-diarylimidazolidinylidene-(2)] of the formula:

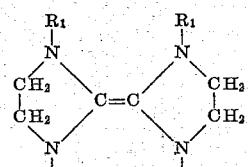

wherein $R_1$ has the same definition as above, with an aldehyde of the formula:

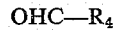

wherein $R_4$ has the same definition as above.

References Cited by the Examiner

Morton: The Chemistry of Heterocyclic Compounds, p. VI of the preface, McGraw-Hill, New York, 1946.

Royals Advanced Organic Chemistry, pages 732–42, Englewood Cliffs, Prentice-Hall, 1954.

Wanzlick et al.: Chemische Berichte, vol. 94, pages 2389–93 (September 1961).

Wanzlick et al.: Chem. Ber., vol. 86, pages 1463–6 (1953).

Wheland: Advanced Organic Chemistry 2nd ed., pages 580–83, New York, Wiley, 1949.

WALTER A. MODANCE, *Primary Examiner.*

DUVAL T. McCUTCHEN, NICHOLAS S. RIZZO, *Examiners.*